(12) United States Patent
Henson et al.

(10) Patent No.: US 7,844,813 B2
(45) Date of Patent: Nov. 30, 2010

(54) METHOD, SYSTEM AND PROCESS FOR DATA ENCRYPTION AND TRANSMISSION

(75) Inventors: Kevin M. Henson, Garland, TX (US); Eric Myron Smith, Dallas, TX (US)

(73) Assignee: Durward D. Dupre, Plano, TX (US)

( * ) Notice: Subject to any disclaimer, the term of this patent is extended or adjusted under 35 U.S.C. 154(b) by 949 days.

(21) Appl. No.: 10/196,061

(22) Filed: Jul. 15, 2002

(65) Prior Publication Data

US 2003/0014671 A1 Jan. 16, 2003

Related U.S. Application Data (60) Provisional application No. 60/305,216, filed on Jul. 13, 2001.

(51) Int. Cl.
*H04L 29/06* (2006.01)
(52) U.S. Cl. .................. 713/150; 380/277; 726/5
(58) Field of Classification Search .......... 713/150; 726/5; 380/277
See application file for complete search history.

(56) References Cited

U.S. PATENT DOCUMENTS

| | | | |
|---|---|---|---|
| 5,245,658 A | | 9/1993 | Bush et al. |
| 5,577,125 A * | | 11/1996 | Salahshour et al. ............ 380/54 |
| 5,606,507 A * | | 2/1997 | Kara ........................... 705/408 |
| 5,630,059 A * | | 5/1997 | Brady et al. ................. 709/217 |
| 5,666,284 A * | | 9/1997 | Kara ........................... 705/402 |
| 5,717,597 A * | | 2/1998 | Kara ........................... 705/408 |
| 5,754,306 A * | | 5/1998 | Taylor et al. ................. 358/400 |
| D395,044 S * | | 6/1998 | Morioka et al. ............. D14/493 |
| 5,801,944 A * | | 9/1998 | Kara ........................... 705/401 |
| 5,805,811 A * | | 9/1998 | Pratt et al. ................... 709/206 |
| 5,819,240 A * | | 10/1998 | Kara ........................... 705/408 |
| 5,825,893 A * | | 10/1998 | Kara ............................. 380/51 |
| 5,859,967 A * | | 1/1999 | Kaufeld et al. ................. 726/5 |
| 5,924,080 A * | | 7/1999 | Johnson ...................... 725/138 |
| 6,023,506 A * | | 2/2000 | Ote et al. ..................... 713/165 |
| 6,023,510 A * | | 2/2000 | Epstein ......................... 705/74 |
| 6,035,402 A * | | 3/2000 | Vaeth et al. .................... 726/2 |
| 6,199,054 B1 * | | 3/2001 | Khan et al. .................. 705/400 |

(Continued)

FOREIGN PATENT DOCUMENTS

WO  WO 02/23799  3/2002

OTHER PUBLICATIONS

Padwick et al., Special Edition Using Microsoft® Outlook® 2000, May, 1999, QUE.*

(Continued)

*Primary Examiner*—David García Cervetti
(74) *Attorney, Agent, or Firm*—Dowell & Dowell, P.C.

(57) ABSTRACT

A system, process and method for data encryption and transmission are disclosed. By adopting the paradigm of a pre-paid self addressed express envelope end-users will interact with this invention in much the same way they interact with traditional delivery systems. They simply provide the content, and delivery takes place without any further user intervention. The encryption is a "software appliance". This software already knows the identity of the sender and the receiver and the encryption key that is to be used; all it needs from the user is the information which is to be securely transported.

16 Claims, 8 Drawing Sheets

U.S. PATENT DOCUMENTS

| | | | |
|---|---|---|---|
| 6,208,980 B1* | 3/2001 | Kara | 705/408 |
| 6,239,798 B1* | 5/2001 | Ludolph et al. | 715/788 |
| 6,256,668 B1* | 7/2001 | Slivka et al. | 709/220 |
| 6,304,897 B1* | 10/2001 | Venkatraman et al. | 709/206 |
| 6,308,277 B1* | 10/2001 | Vaeth et al. | 726/10 |
| 6,427,140 B1* | 7/2002 | Ginter et al. | 705/80 |
| 6,477,647 B1* | 11/2002 | Venkatraman et al. | 713/193 |
| 6,584,564 B2* | 6/2003 | Olkin et al. | 713/152 |
| 6,615,349 B1* | 9/2003 | Hair | 713/165 |
| 6,636,970 B2* | 10/2003 | Akiyama et al. | 713/189 |
| 6,640,301 B1* | 10/2003 | Ng | 713/156 |
| 6,751,670 B1* | 6/2004 | Patterson | 709/229 |
| 6,862,576 B1* | 3/2005 | Turner et al. | 705/26 |
| 6,868,498 B1* | 3/2005 | Katsikas | 726/14 |
| 6,873,966 B2* | 3/2005 | Babbitt et al. | 705/12 |
| 6,873,977 B1* | 3/2005 | Aggarwal et al. | 705/64 |
| 6,931,551 B2* | 8/2005 | Weng et al. | 380/201 |
| 6,965,926 B1* | 11/2005 | Shapiro et al. | 709/219 |
| 6,968,458 B1* | 11/2005 | Ruddle | 713/186 |
| 6,990,504 B2* | 1/2006 | Powell et al. | 1/1 |
| 7,117,370 B2* | 10/2006 | Khan et al. | 713/186 |
| 7,266,504 B1* | 9/2007 | Kara | 705/1 |
| 7,343,357 B1* | 3/2008 | Kara | 705/401 |
| 7,363,495 B2* | 4/2008 | Felt et al. | 713/170 |
| 7,418,737 B2* | 8/2008 | Grupe | 726/33 |
| 2001/0020228 A1* | 9/2001 | Cantu et al. | 705/1 |
| 2001/0037315 A1* | 11/2001 | Saliba et al. | 705/70 |
| 2002/0007453 A1* | 1/2002 | Nemovicher | 713/155 |
| 2002/0019937 A1* | 2/2002 | Edstrom et al. | 713/168 |
| 2002/0035533 A1* | 3/2002 | Mache et al. | 705/37 |
| 2002/0053030 A1* | 5/2002 | Weng et al. | 713/201 |
| 2002/0059144 A1* | 5/2002 | Meffert et al. | 705/51 |
| 2002/0116276 A1* | 8/2002 | Ottley | 705/26 |
| 2002/0116508 A1* | 8/2002 | Khan et al. | 709/229 |
| 2002/0138735 A1* | 9/2002 | Felt et al. | 713/176 |
| 2002/0150240 A1 | 10/2002 | Henson et al. | |
| 2002/0178353 A1* | 11/2002 | Graham | 713/151 |
| 2002/0194356 A1* | 12/2002 | Chan et al. | 709/231 |
| 2003/0126463 A1* | 7/2003 | Sistla | 713/201 |
| 2003/0154383 A9* | 8/2003 | Wiley et al. | 713/189 |
| 2004/0024635 A1* | 2/2004 | McClure et al. | 705/12 |
| 2005/0171715 A1* | 8/2005 | Saitoh et al. | 702/82 |
| 2008/0021849 A1* | 1/2008 | Kara | 705/408 |
| 2008/0140578 A1* | 6/2008 | Felt et al. | 705/71 |

OTHER PUBLICATIONS

Leslie Lamport, Password Authentication with Insecure Communication, Nov. 1981, ACM.*

Schneier, Bruce; "Applied Cryptography Second Edition" 1996, John Wiley & Sons, Inc. USA XP002268639, p. 10-p. 12, p. 193-p. 196.

* cited by examiner

DOCUMENT DISPATCH OPTION 1

READER ACTIVATION

METHOD, SYSTEM AND PROCESS FOR DATA ENCRYPTION AND TRANSMISSION

CLAIM OF PRIORITY

This application claims priority of Provisional Application Ser. No. 60/305,216 entitled METHOD, SYSTEM AND PROCESS FOR DATA ENCRYPTION AND TRANSMISSION, filed Jul. 13, 2001.

FIELD OF THE INVENTION

This invention relates generally to the field of information handling and more specifically to a method and system for data encryption and transmission. Even the best encryption system can't protect data if it is too difficult and or time consuming for the end user to use. This invention focuses on making secure data transmission drag and drop simple by adopting the paradigm of a pre-paid self addressed express envelope or courier.

BACKGROUND OF THE INVENTION

The security of information poses challenges for businesses and other organizations that transmit and store information. Data encryption is intended to transform data into a form readable only by authorized users. However a large majority of information is not encrypted due to the difficulty or inconvenience of using most encryption software. In light of this the need has arisen to develop encryption into a "software appliance". This software knows the identity of the sender and the receiver and the encryption key that is to be used; all it needs from the user is the information which is to be securely transported. By adopting the paradigm of a pre-paid, self addressed express envelope end users will interact with this invention in much the same way they interact with traditional delivery systems that simply provide for the delivery and take place without any further user intervention.

SUMMARY OF THE INVENTION

This invention is primarily a process to make using strong encryption (such as described in U.S. patent application Ser. Nos. 09/797,272 09/797,066 09/797,107 09/797,068 09/797,079 09/796,694) easier for end users. In doing so it leverages the wide-spread availability of public information networks to rapidly deliver private content to a predetermined recipient. This software encryption appliance is designed around the look and feel of a pre-paid pre-addressed express delivery envelope similar to those used every day in such industries as accounting, legal and financial. When an accountant, lawyer, broker or other professional needs to get high-value, confidential correspondence from a client, it is accepted practice to provide the client with pre-addressed pre-paid express envelopes from some commercial overnight or express delivery service. This invention seeks to translate this process into the digital world. A client would be provided with a computer program whose graphical user interface (GUI) resembles an addressed envelope. In order to send a secure communication to the providing professional service "PPS", the client merely has to "drag and drop" the intended document into the appropriate desktop Icon. This process is far easier and more streamlined than email programs that use the so called public key infrastructure. After dropping a file on the icon, a confirm box pops up. After confirming the intention to send, there is no other intervention needed on the user's part. This eliminates the hassle of public key management, prevents misdirected communications and assures that the delivery will take place without the confidentiality of the message being compromised.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE PREFERRED EMBODIMENT

This invention is primarily a process to make using strong encryption (such as described in co-pending commonly assigned U.S. patent applications identified as Ser. Nos. 60/226,400 09/797,272 09/797,066 09/797,107 09/797,068 09/797,079 09/796,694) easier for end-users, the teachings of which are incorporated herein by reference. This software encryption appliance is designed around the look and feel of a pre-paid pre-addressed express delivery envelope similar to those used every day in such industries as accounting, legal and financial. When an accountant, lawyer, broker or other professional needs to get high-value, confidential correspondence from a client, it is accepted practice to provide the client with pre-addressed pre-paid, express envelopes from some commercial overnight or express delivery service. This invention seeks to translate this process into the digital world.

This process has two main components. The first component is the creation and distribution of a pre-addressed digital envelope. The second portion is the digital envelope itself. This envelope allows drag and drop encryption and transmission back to the distributing party. This digital envelope also has the ability to decrypt and display return correspondence or files.

Envelope creation is handled by an administration program that allows the creation and assignment of encryption such as disclosed in the cross referenced patent application Ser. Nos.

09/797,079 and 09/796,694, keys and the management of distribution lists or groups. To facilitate ease of use, the user interface for envelope creation contains elements that simulate the look and feel of a traditional mailing envelope. In one commercial implementation model the administration program assigns a number of uses to the digital envelope that counts down. This information appears in the area where stamps would be placed on a traditional envelope. The "TO" and "FROM" fields of the envelope are filled out prior to distribution. Typically, the envelope provider puts their own information in the "TO" field and their client's information in the "FROM" field. A key is assigned to the envelope and the creation time along with all other relevant information is logged for auditing purposes. The envelope is generated and distributed by some suitable trusted means generally to the party listed in the "FROM" field.

An end user is provided with a computer program from some party who wishes to receive confidential communications. The program sets itself up as a desktop icon that resembles an envelope. Any file dragged over and dropped on the envelope is copied, encrypted and sent to whatever address was embedded in the envelope at the time of creation. After confirming the intention to send, there is no other intervention needed on the user's part. This eliminates the need for public key management and prevents misdirected communications. Since the communications are secured with the strong encryption technology, such as disclosed in the cross referenced patent application Ser. Nos. 60/226,400 09/797,272 09/797,066 09/797,107 09/797,068 09/797,079 09/796,694, there is assurance that the delivery will take place without the confidentiality of the message being compromised.

Figure 1:
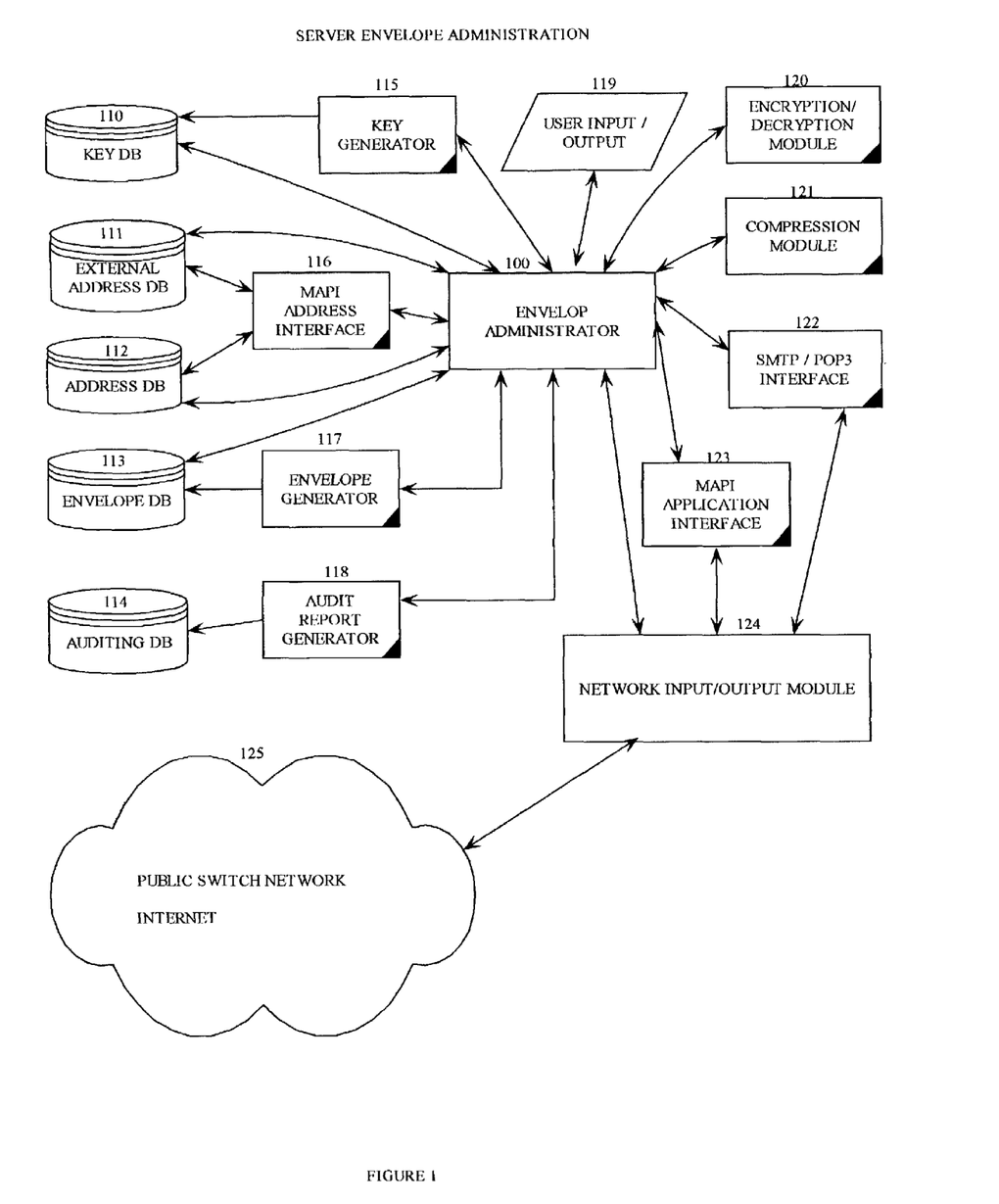
FIG. 1 This figure is a schematic diagram that shows the various parts of the envelope administration software.
Figure 2:
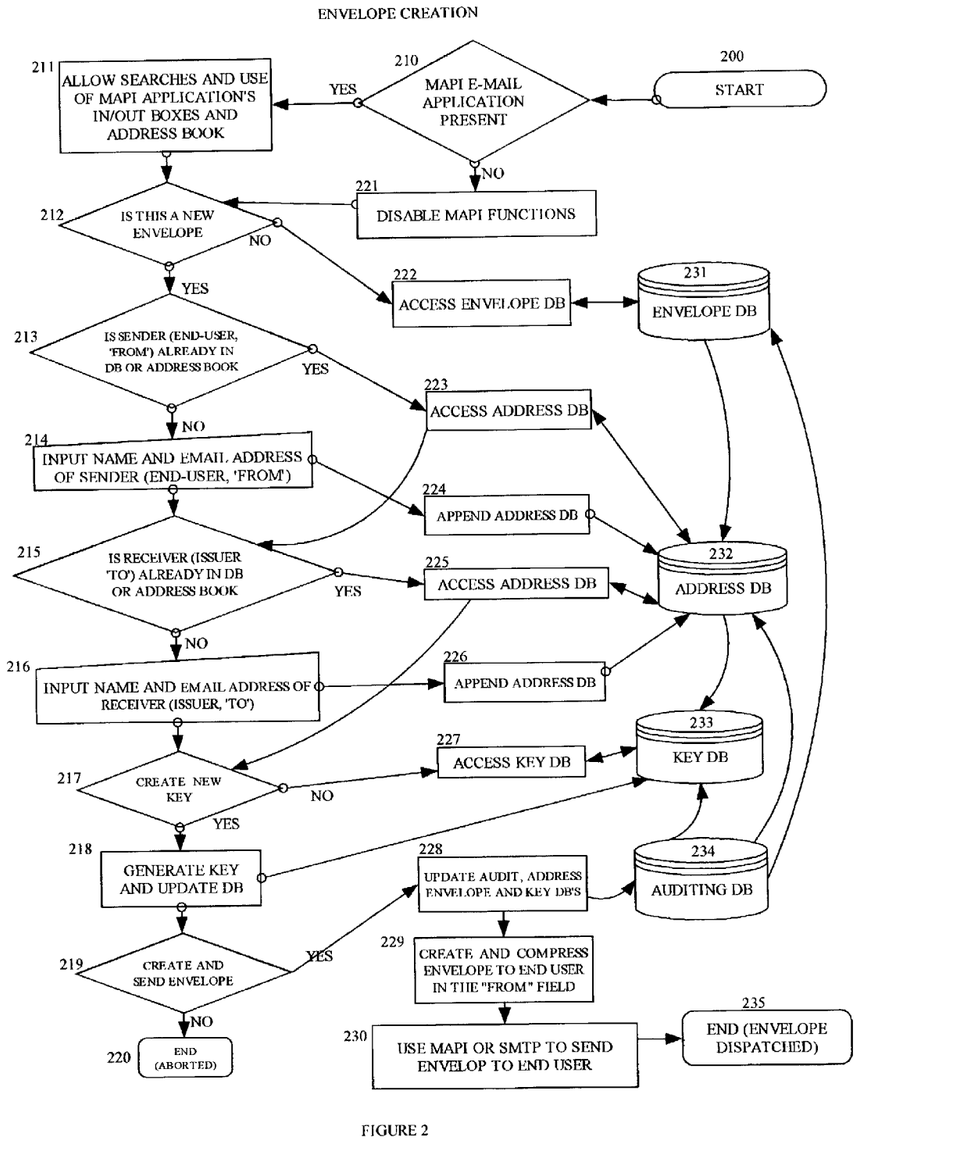
FIG. 2 This figure is a flow chart illustrating the operation of the envelope administration software.
Figure 3:
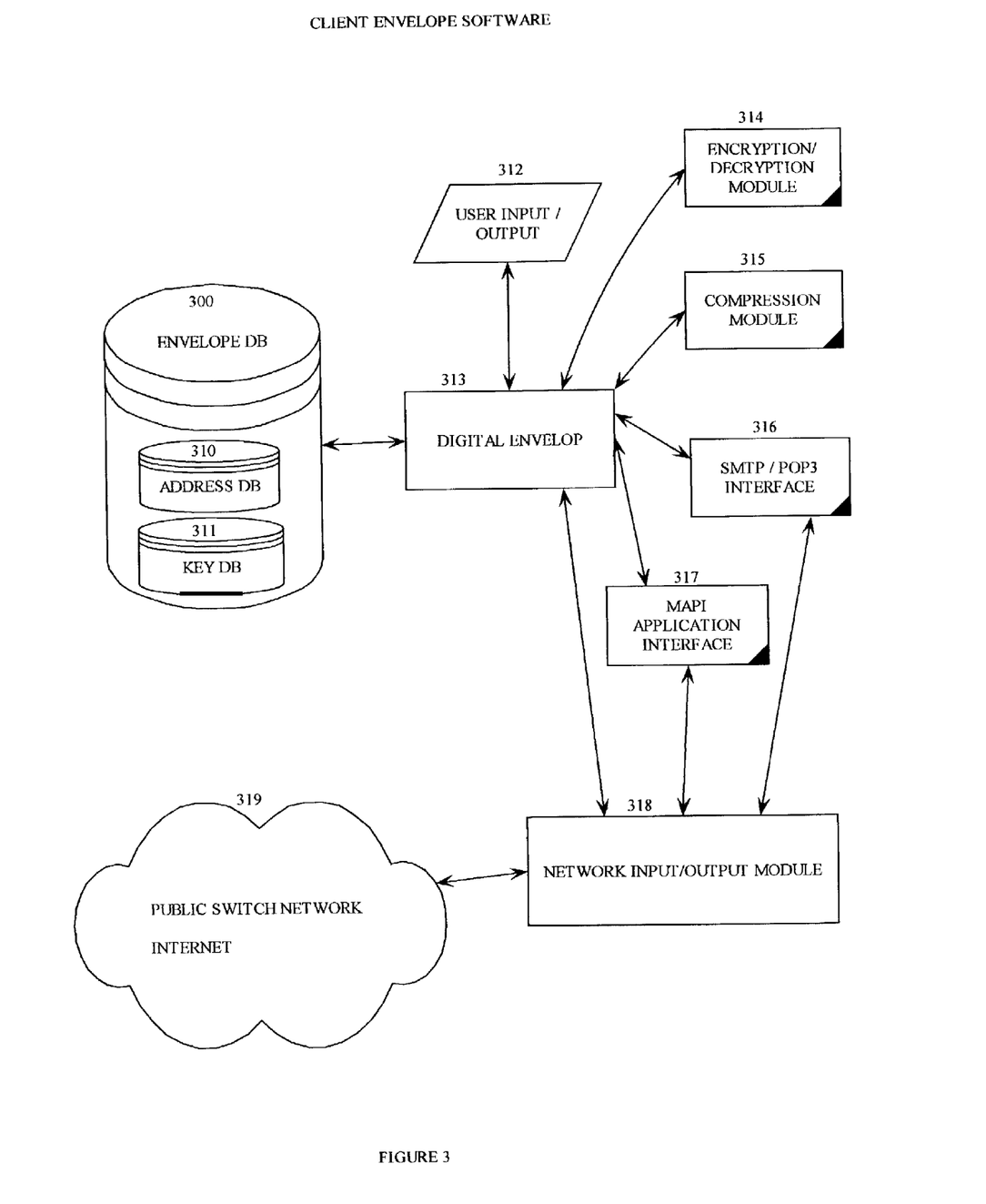
FIG. 3 This figure shows is a schematic diagram illustrating the various parts of the digital envelope software.
Figure 4:
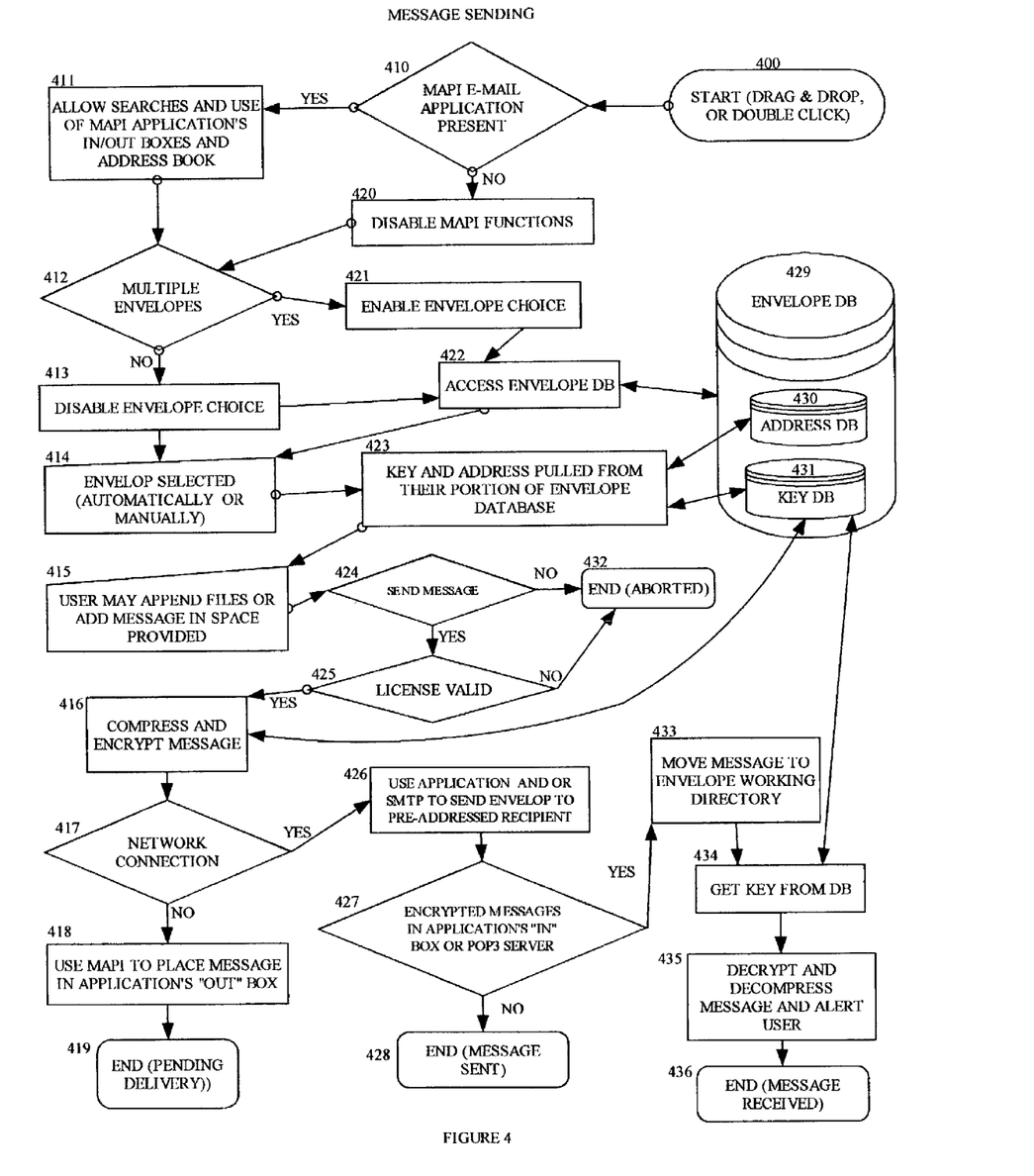
FIG. 4 This figure is a flow chart illustrating the operation of the digital envelope software.
Figure 6:
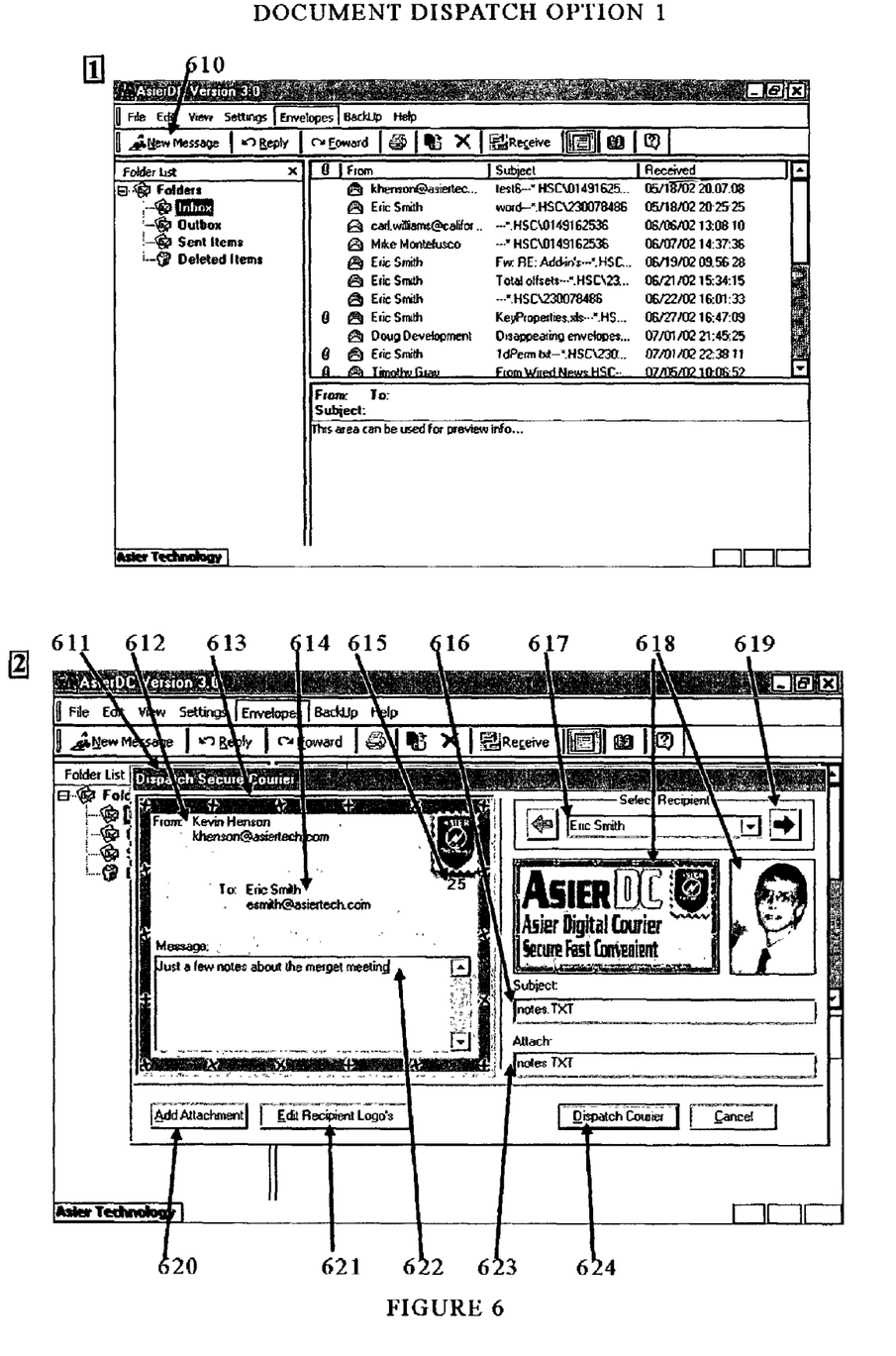
FIG. 6 This figure is a series of screen captures that demonstrates the process of pulling up a previously created digital envelope from the data base file.
Figure 7:
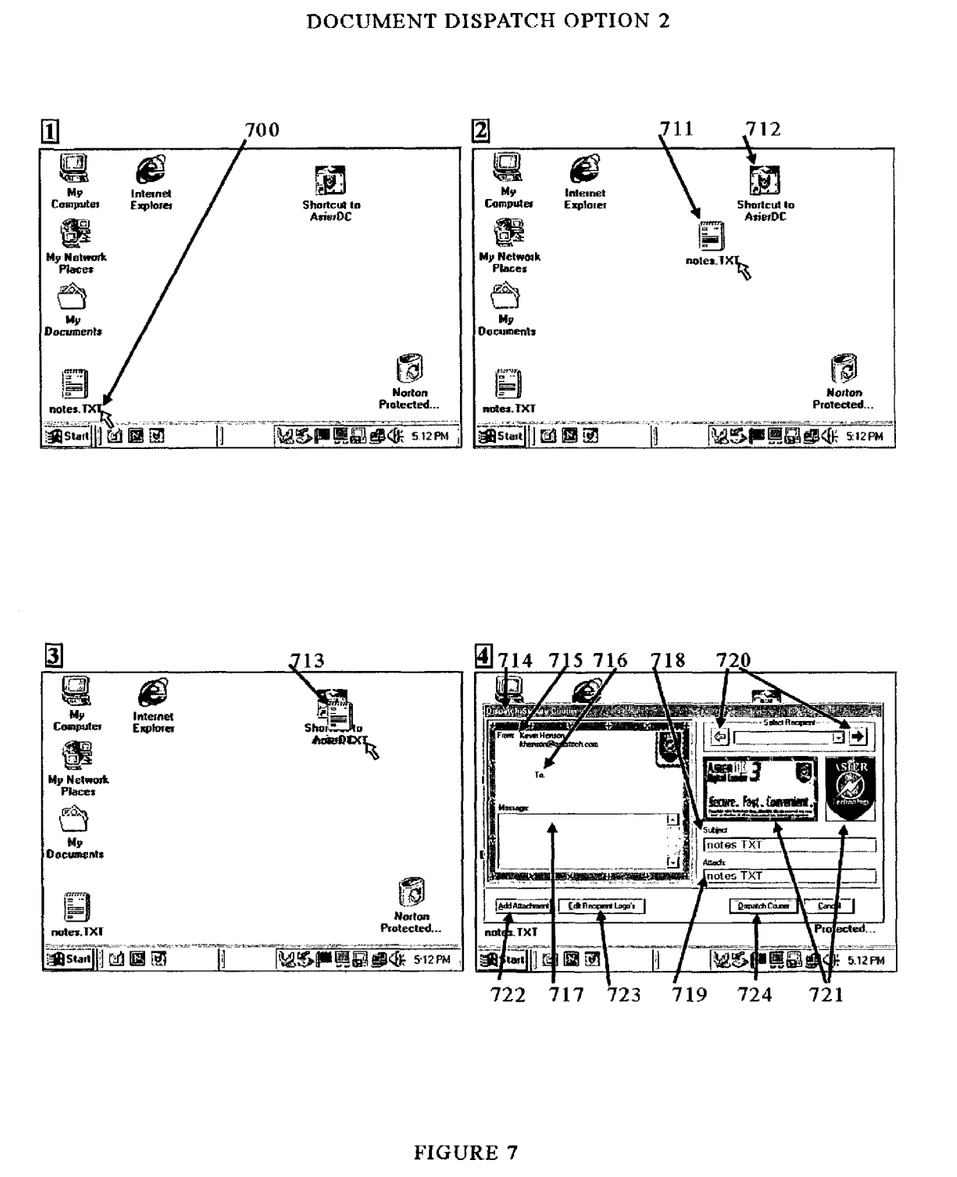
FIG. 7 This figure is a series of screen captures that demonstrates the process of dragging and dropping a digital document over the digital envelope. The graphical user interface prominently displays a graphical representation of a traditional mailing envelope, as well as a send or cancel button.
Figure 8:
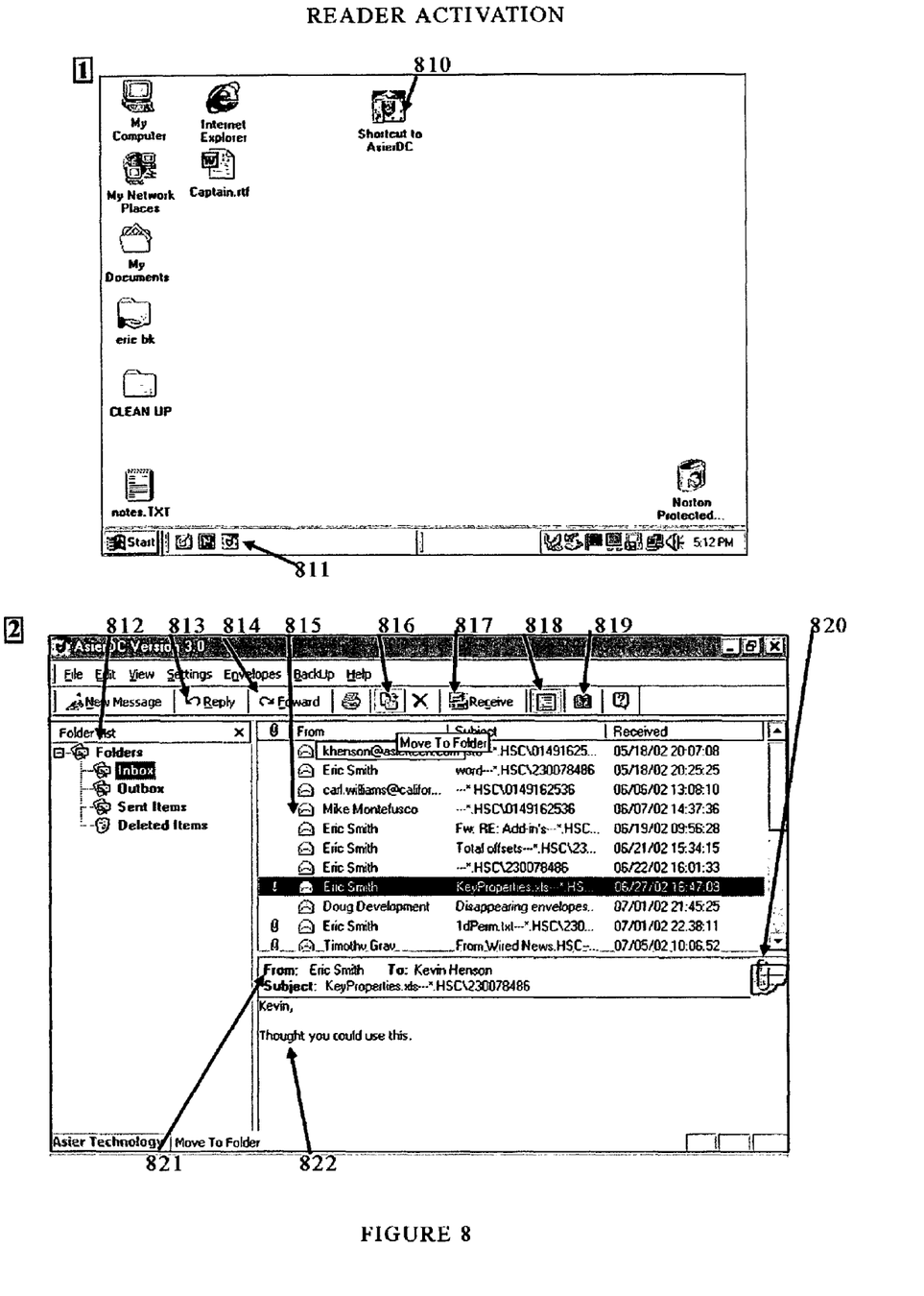
FIG. 8 This figure is a series of screen captures that demonstrates the process of double clicking on the digital envelope to launch the graphical user interface which prominently displays a graphical representation of a traditional mailing envelope. From here secure messages can be encrypted and sent to compatible locations.

In the current operational mode of the present invention, referred to as Asier Digital Courier, there consists of two different pieces of software. The first is an administrative tool that has the ability to create secure communication channels. This application is referred to as an "Envelope Administrator" or server. FIGS. 1 and 2 depict the inner workings of the server and FIG. 5 deals with the actual use of the server to create a second type of software, a client or digital envelope. FIGS. 3 and 4 deal with the working of the client and FIGS. 6, 7 and 8 show its operation in sending and receiving secure messages.

As illustrated in FIG. 1, the server software is made up of numerous elements. The Envelope Administrator (ELEMENT 100) is the central logic that controls everything, and receives user input/output at 119. The Envelope Administrator interacts with all the various modules and databases. A data compression module (ELEMENT 121) is adapted to reduce the size of incoming data. An encryption/decryption module (ELEMENT 120) is adapted to encrypt all database records stored on the local drive and all information sent over the network. A MAPI (Messaging Application Programming Interface) interfaces (ELEMENTS 116 and 123) so that the server application can access the address books of third party MAPI compliant e-mail application and use the IN/OUT Boxes of such applications for message handling. Additional network flexibility is in the form of a standard POP (Post Office Protocol)/SMTP (Simple Mail Transfer Protocol) interface (ELEMENT 122) that allows the envelope administrator to distribute client envelopes and send/receive messages directly to compatible network servers 125 via network input/output module 124 even when MAPI compliant e-mail applications are unavailable. The envelope server software is distinguished from the client software in several important ways. The administrator/server gets its name from its ability to generate subordinate client applications, and this is possible due to the envelope and key generator modules (ELEMENTS 115 and 117). For business reasons the total number of clients (or envelopes) issued is adapted to be monitored and controlled with the Audit Report Generator (ELEMENT 118). In some instances the administrator may produce envelopes with a limited number of uses, while in other scenarios the administrator can only produce a limited number of client envelopes. The results are stored securely within the Auditing Database (ELEMENT 114). ELEMENT 110 depicts a key database module, ELEMENT 112 is an address database module, and ELEMENT 113 shows an envelope database module.

The envelope (client) creation process is detailed in FIG. 2. At the beginning 200 of this process a determination is made about the availability a MAPI compliant e-mail application (ELEMENT 210). If such an application is present, then the server can use the MAPI address book for envelope creation, and steps 212-217, and 220-229, 235 are executed (ELEMENT 211). The "TO" and "FROM" information can be populated from internal databases (ELEMENTS 231 and 232), external (MAPI) address books FIG. 1 (ELEMENT 111) FIG. 5 (ELEMENT 517) or manually FIG. 5 (ELEMENT 518). It is important to remember that the server has complete control over the operation of the envelope and that the eventual user of the client cannot change the destination key or any other feature of the envelope. An existing encryption key may be selected (ELEMENT 233), or a new one may be created and named (ELEMENT 218). The user has the opportunity to continue or cancel (ELEMENT 219). If the user continues, relevant information is stored encrypted in the appropriate databases (ELEMENTS 231, 232, 233 and 234) and a client envelope application is created. The envelope is sent over a network (ELEMENT 230) or stored locally for other distribution FIG. 5 (ELEMENT 526).

The client envelope software detailed in FIG. 3 is highly reminiscent of the server software from FIG. 1. The most important difference is that the envelope database contains the key and address databases and is not alterable (ELEMENTS 300, 310 and 311). The client can necessarily compress decompress, encrypt and decrypt with the same modules (ELEMENTS 314 and 315) as the server software. The client also has the same network (ELEMENT 319) access choices (ELEMENTS 316 and 317) as the server which are accessible via network input/output module 318. Envelope creation module 313 receives user input/output 312.

There is little difference between how a server sends a client envelope and how either a client or a server sends a secure message. As shown in FIG. 4 the process begins at 400 with checking for MAPI compliant e-mail clients at steps 410 and 411. If no MAPI e-mail applications are present, the MAPI function is disabled at 420. Next, an envelope must be selected (ELEMENTS 412, 421, 422, 429, 413 and 414). If only one envelope exists (as in a client), then this process is greatly simplified (ELEMENT 413). The envelope contains the necessary information about keys and addresses (ELEMENTS 423, 430 and 431). A user may append files or add text message to be encrypted and sent (ELEMENT 415) FIG. 6 (ELEMENTS 622 and 623). The user is given a choice to continue or abort (ELEMENT 424). If the user continues, the program checks to see if the licensing rules are being followed (ELEMENT 425). If user does not continue, the program ends at 432. All data is compressed and encrypted (ELEMENT 416). Next, a network status check is made at 417. If the network is available the secure message is sent immediately (ELEMENT 426). If no network is available and MAPI is present at 417, the message is placed in the MAPI compliant application's OUT Box for later delivery (ELEMENT 418) and the process ends at 419. After the message is delivered a sweep of network POP3 servers and or local MAPI IN Boxes is made for any pending incoming secure mail (ELEMENT 427). Any waiting incoming encrypted messages are moved (ELEMENT 433) decrypted (ELEMENTS 434 and 435) and displayed for the user FIG. 8 Part 2, and the process ends at 436. If there are no awaiting incoming encrypted messages at 427, the process ends at 428.

Figure 5:
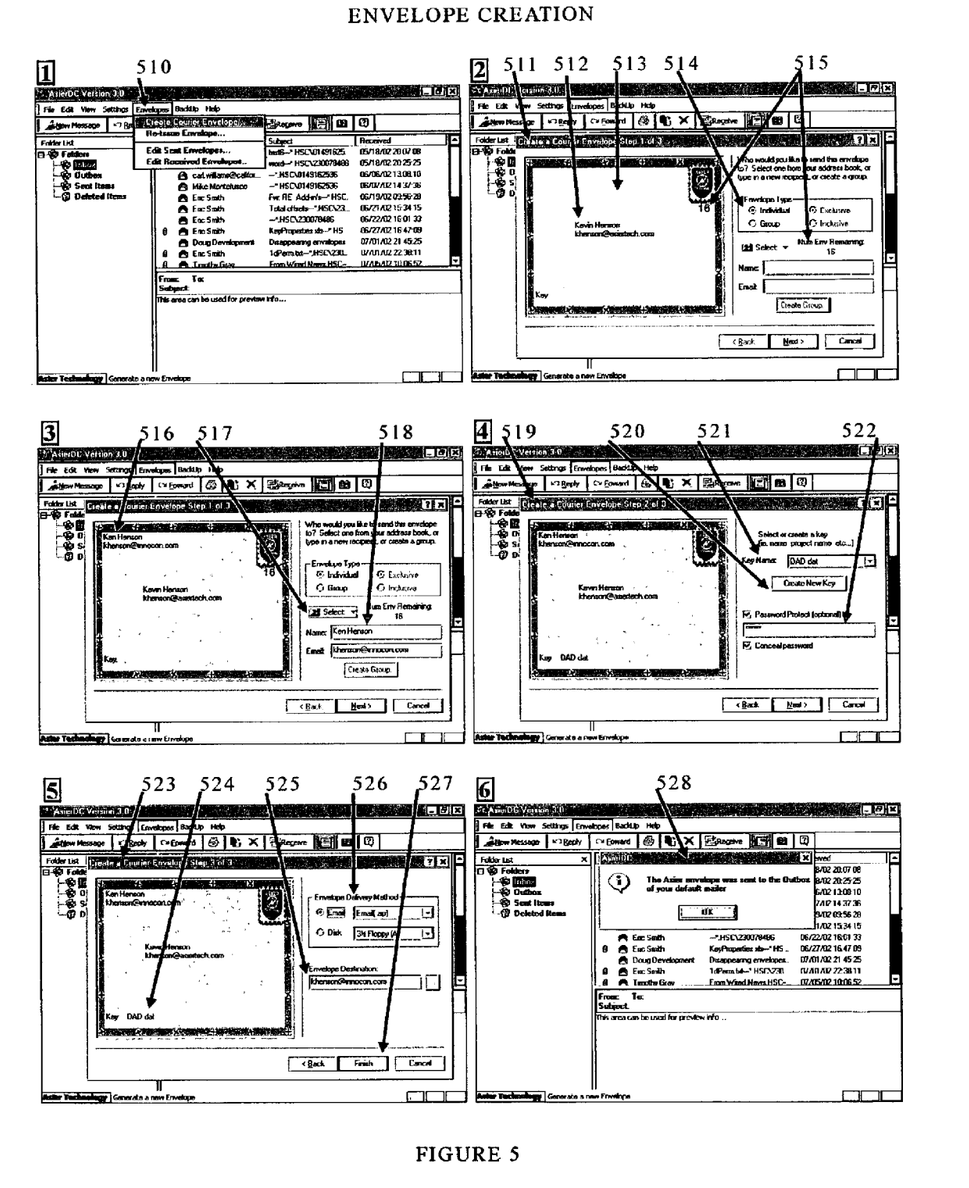
FIG. 5 This figure is a series of screen captures that demonstrates the process of creating a digital envelope with the envelope administrator. The graphical user interface prominently displays a graphical representation of a traditional mailing envelope.

The creation of digital courier client envelopes is designed to be very simple for the user, as shown in FIG. 5. From the main screen, the "Envelope" is clicked at the menu on the tool bar and the "Create Courier Envelope" (ELEMENT 510) is selected. Screen 1 of the envelope creation tool (ELEMENT 511) pops up. In most cases it will already have the server's return address (ELEMENT 512). The graphic user interface is designed around the paradigm of a business reply envelope (ELEMENT 513). An envelope may be created for an individual or a group (ELEMENT 514). The number of envelopes remaining for a particular server may be shown next to the stamp graphic or in it's own text field (ELEMENT 515). The client's address (ELEMENT 516) can be selected form an address book (ELEMENT 517) or manually entered in the space provided (ELEMENT 518). "Next" brings the user to screen 2 of the envelope creation tool (ELEMENT 519) pops up. Encryption keys may be created and named (ELEMENT 520) or selected from a database (ELEMENT 521). Additionally, a password (or phrase) for initial (one time) key exchange and installation may be added for extra security (ELEMENT 522). The third and final envelope creation screen (ELEMENT 523) allows the user to select the delivery method. A user can choose to send the envelop as an executable file or a zip file (ELEMENT 526). Due to firewall issues a zip file is usually preferred. This compressed and encrypted file can be e-mailed across the network, or it could be saved to some other location for other delivery means (ELEMENT 526). Finally, after the file is sent, the user receives a confirmation message (ELEMENT 528). Element 524 depicts a key, element 525 depicts an envelope destination field, and element 527 depicts the finish.

There are a variety of ways to invoke digital courier to send a message as FIGS. 6 and 7 show. The "New Message" button (ELEMENT 610) may be clicked or a file (ELEMENT 700) may be dragged over the Digital Courier short cut (ELEMENTS 711, 712 and 713). In either case, the "Dispatch Secure Courier" screen (ELEMENT 611) pops up. If more than one envelop exists then selection can be made from a drop down list (ELEMENT 617) or page arrows (ELEMENT 619). Once the envelope is selected the FROM (ELEMENT 612), TO(ELEMENT 614), and KEY fields are set. Attachments can be added (ELEMENT 620) and messages can be typed (ELEMENT 622). Administrators with the server application can customize the look of the envelope (ELEMENT 621) by adding graphics (ELEMENT 618) that can be seen on the server and on the client. An administrator can customize an envelope so that the client sees a picture of the administrator (and perhaps a marketing message) while the server sees a picture of the client so as to ensure the correct envelope is selected for delivery. Element 613 depicts a digital envelope, element 615 depicts a reference number, element 616 depicts a subject field, and element 624 depicts a dispatch courier. Element 714 depicts a dispatch secure courier window, element 715 depicts a "FROM" field, element 716 depicts a "TO" field and element 717 depicts a "MESSAGE" field. Element 718 depicts a "SUBJECT" field, element 719 depicts an "ATTACH" field, and element 720 depicts a "FORWARD and REVERSE" arrow. Element 721 depicts a company logo, element 722 depicts an "ADD ATTACHMENT" button, element 723 depicts an "EDIT RECIPIENT LOGO's" button, and 724 depicts a "DISPATCH COURIER" button.

Advantageously, reading encrypted messages is no more difficult with Asier Digital Courier than reading normal email. As shown in FIG. 8, simply double click on the shortcut (ELEMENTS 810 and 811) and the main viewer screen opens. Multiple folders (ELEMENT 812) are provided for moving (ELEMENT 816) sorting and storing messages. Normal e-mail function like "Reply" (ELEMENT 813), "Forward" (ELEMENT 814), "Split Preview" (ELEMENT 818) and "Address Book" (ELEMENT 819) are fully supported. A list of stored messages (ELEMENT 815) allows the user to pick a message that is stored encrypted and have it immediately decrypted and displayed (ELEMENT 822). Attachments (ELEMENT 820) are stored encrypted in Digital Courier and decrypted when they are clicked on. Element 821 depicts a "FROM" and "TO" field, along with a "SUBJECT" field.

It is important to note that Digital Courier has a host of additional security features that are not obvious. All Digital Courier databases (address, key, envelope, message and attachments) are stored encrypted on the hard drive. Strong password access is available for application launch. When a client user is attempting to install a client envelope a search of the registry is made. If the email address and name provided by the server are not present in the client's registry the installation is aborted and the envelope will not deploy. The digital courier reader application will not support scripts, DHTML or Java code, and this is to prevent a possible infected file from gaining a foothold. All attachments are stored in an encrypted "inert state." mail cannot be misdirected.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A method of securely receiving data over a communications network, the method comprising:

providing a "TO" address to an envelope administration program running on a first processor, the "TO" address being provided by a first user who is associated with the "TO" address;

providing a "FROM" address to the envelope administration program, the "FROM" address being provided by the first user, and the "FROM" address being associated with a second user;

generating a digital envelope based on the "TO" and "FROM" addresses using the envelope administration program, the digital envelope having an encryption module;

sending the digital envelope from the first user to the second user at the "FROM" address over the communications network; and displaying an icon resembling an envelope to the second user using a second processor, wherein the icon is associated with the digital envelope;

the second user dragging and dropping unencrypted data onto the icon causing the digital envelope to generate encrypted data from the unencrypted data using the encryption module; and the second user confirming intention to send the encrypted data to the first user, and, without other intervention by the second user, sending the encrypted data to the first user at the "TO" address using the digital envelope.

2. The method of claim 1, wherein the "TO" and "FROM" addresses are stored in at least one of a database and a file.

3. The method of claim 1, wherein the digital envelope is graphically represented by a traditional mailing envelope.

4. The method of claim 3, wherein the digital envelope has the "FROM" address in an upper left corner of the graphical representation of the traditional envelope.

5. The method of claim 4, wherein the digital envelope has the "TO" address in a center of the graphical representation of the traditional envelope.

6. The method of claim 3, wherein
the digital envelope has a count down marker and the count down marker specifies the number of digital envelopes authorized for the "FROM" address; and
the count down marker is reduced when the encrypted data is sent to the "TO" address.

7. The method of claim 6, wherein the number of envelopes authorized for the "FROM" address is recorded in at least one of an audit file and a database.

8. The method of claim 6, wherein the count down marker is displayed in an upper right corner of the traditional envelope adjacent a stamp graphic.

9. The method of claim 1, wherein the digital envelope is securely sent to the "FROM" address utilizing an electronic delivery system.

10. The method of claim 1, wherein the digital envelope has a compression module, and the encrypted data is compressed by the compression module before sending to the "TO" address.

11. The method of claim 1, wherein an encryption key is associated with a group comprising one or more "FROM" addresses.

12. The method of claim 11, wherein the association between the group and the encryption key is stored in at least one of a file and a database.

13. The method of claim 1, wherein the digital envelope is sent to the "FROM" address as a self-extracting executable program.

14. The method of claim 1, wherein the digital envelope is sent to the "FROM" address as a compressed program.

15. A method of securely receiving data over a communications network, the method comprising:
providing a first address to an envelope administration program running on a first processor, the first address being associated with a first user;
providing a second address to the envelope administration program, the second address being associated with a second user;
generating a digital envelope based on the first and second addresses using the envelope administration program, the digital envelope having an encryption module;
sending the digital envelope from the first user to the second user at the second address over the communications network; and
the second user associating unencrypted data with the digital envelope using a second processor causing the digital envelope to generate encrypted data from the unencrypted data using the encryption module; and
sending the encrypted data to the first user at the first address using the digital envelope.

16. A method of securely receiving data over a communications network, the method comprising:
providing a first address to an envelope administration program running on a first processor, the first address being associated with a first user;
providing a second address to the envelope administration program, the second address being associated with a second user;
generating a digital envelope based on the first and second addresses using the envelope administration program, the digital envelope having an encryption module;
sending the digital envelope from the first user to the second user at the second address over the communications network; and
receiving encrypted data from the second user, wherein the encrypted data is generated from unencrypted data by the encryption module after the unencrypted data is associated with the digital envelope by the second user.

* * * * *